N. H. LIVINGSTON.
PROCESS OF RECLAIMING OR RECOVERING VALUES FROM DUST.
APPLICATION FILED AUG. 16, 1909.
943,752.
Patented Dec. 21, 1909.
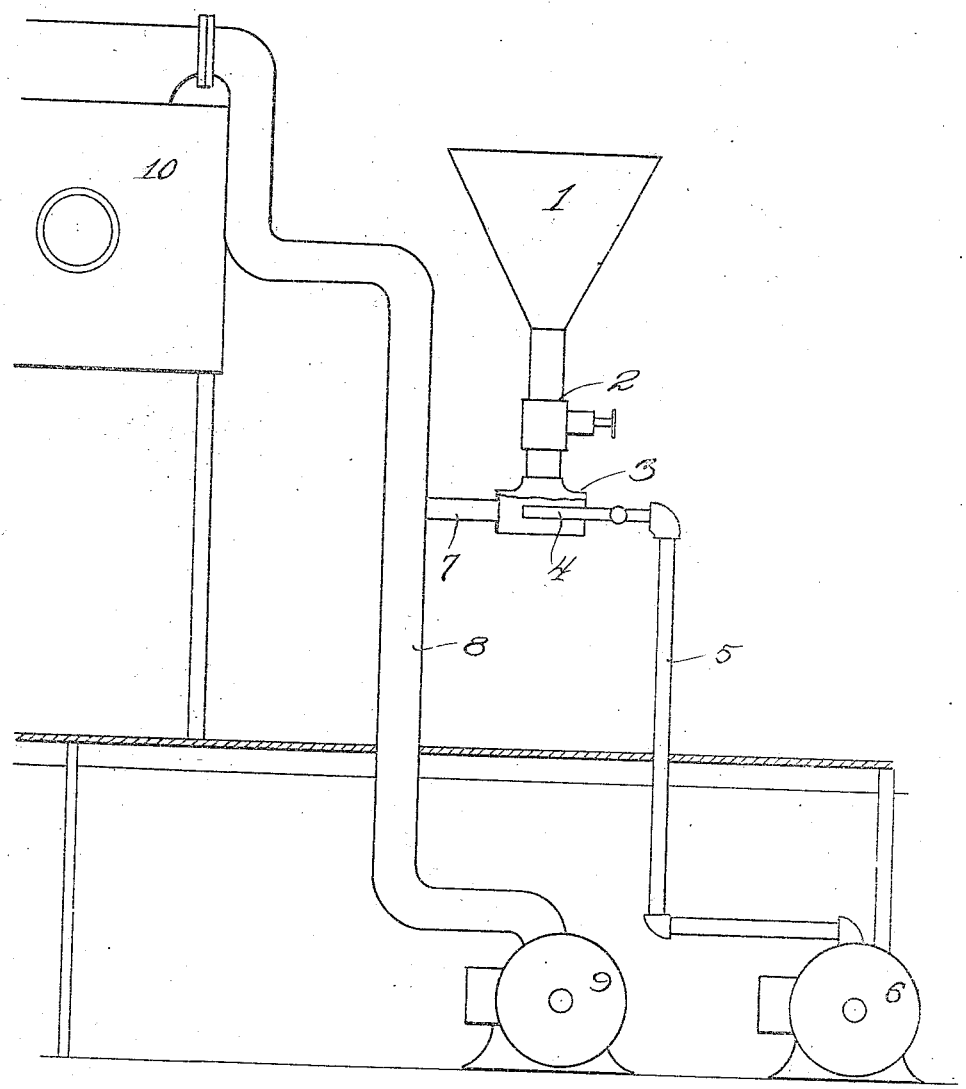
Inventor
Nathan H. Livingston.

UNITED STATES PATENT OFFICE.

NATHAN H. LIVINGSTON, OF GLOBE, ARIZONA TERRITORY.

PROCESS OF RECLAIMING OR RECOVERING VALUES FROM DUST.

943,752.

Specification of Letters Patent. Patented Dec. 21, 1909.

Application filed August 16, 1909. Serial No. 513,155.

*To all whom it may concern:*

Be it known that I, NATHAN H. LIVINGSTON, a citizen of the United States, residing at Globe, in the county of Gila and Territory of Arizona, have invented certain new and useful Improvements in Processes for Reclaiming or Recovering Values from Dust, of which the following is a specification, reference being had therein to the accompanying drawing.

This invention relates to a new and improved process of recovering values from flue dusts of smelters, and the principal object of the same is to simplify the known process of the same so as to both cheapen and facilitate the operation.

So far as is now known, the dust for smelters is conveyed to chambers from which it is taken to bricking machines and pressed into bricks and then passed into the furnace and smelted, after which the molten metal is conveyed to the converters where the same is purified.

The present invention aims to dispense with the bricking operation and instead conveys dust directly to the converters.

In the accompanying drawing a convenient apparatus for carrying out the improved process has been shown, in which—

1 designates a hopper in which the dust is delivered and gravitates through valve-controlled pipe 2 into a chamber 3 into which a valve-controlled nozzle 4 of a pipe 5 projects, said pipe 5 being in communication with a high pressure blower 6. Said chamber 3 has a pipe connection 7 with a large pipe 8 of a low pressure blower 9, said pipe 8 discharging into a converter 10.

In this apparatus it will be seen that the nozzle 4 will inject the dust from chamber 3 into pipe 8 and the pressure within said pipe and that from pipe 5 will convey the dust to the converter where it mixes with the molten matte, and the values therein will be converted into molten metal.

It will be seen from the foregoing that the improved process greatly simplifies the process of recovering values from flue dust for the reason that the bricking operation is dispensed with and the dust delivered directly to the hopper and then injected into the converter by means of the blasts from the two blowers.

What I claim is:

1. The improved process of recovering values from flue dust which consists in conveying said dust to a converter to cause the values therein to be melted, and the other particles of the dust to be mixed with the matte.

2. The improved process of recovering values from flue dust which consists in conveying the dust to a converter through the injecting action of a high and a low pressure air blower to cause said dust to mix with the matte in the converter, and reduce the values to molten metal, substantially as described.

3. The improved process of recovering values from flue dust, comprising the delivery of dust by gravitation to a chamber, then subjecting the delivered dust in said chamber to distinct currents of air under high and low pressures for conveying the dust to the converter, for mixing with the molten matte, substantially as and for the purpose specified.

In testimony whereof I hereunto affix my signature in presence of two witnesses.

NATHAN H. LIVINGSTON.

Witnesses:
PETER C. LITTLE,
CHARLES L. RAWLINS.